United States Patent [19]

Johnson et al.

[11] 4,390,039
[45] Jun. 28, 1983

[54] VALVE ASSEMBLY AND DISASSEMBLY DEVICE

[75] Inventors: David A. Johnson, Shrewsbury; Joseph B. Wright, Northboro; Michael Pashoogian, Worcester, all of Mass.

[73] Assignee: Jamesbury Corporation, Worcester, Mass.

[21] Appl. No.: 420,382

[22] Filed: Sep. 20, 1982

Related U.S. Application Data

[63] Continuation-in-part of Ser. No. 336,686, Jan. 4, 1982.

[51] Int. Cl.³ .................. F16K 43/00; F16K 25/00
[52] U.S. Cl. ............................ 137/315; 251/174; 251/315; 251/316
[58] Field of Search ............... 137/315; 251/174, 159, 251/160, 188, 315, 316

[56] References Cited

U.S. PATENT DOCUMENTS

| | | | |
|---|---|---|---|
| 1,738,450 | 12/1929 | Ryan et al. | 251/159 |
| 3,037,738 | 6/1962 | Jackson et al. | 251/315 |
| 3,114,386 | 12/1963 | Dumm | 251/174 |
| 3,171,429 | 3/1965 | Stürmer et al. | 251/159 |
| 3,269,691 | 8/1966 | Meima et al. | 251/174 |
| 3,771,545 | 11/1973 | Allen | 137/315 |
| 3,985,334 | 10/1976 | Domyan | 137/315 |
| 4,175,577 | 11/1979 | Kacal et al. | 137/315 |
| 4,262,691 | 4/1981 | Kacal | 137/315 |
| 4,266,566 | 5/1981 | Kacal et al. | 137/316 |

FOREIGN PATENT DOCUMENTS

1215159 12/1970 United Kingdom ............... 137/315

*Primary Examiner*—George L. Walton
*Attorney, Agent, or Firm*—Oblon, Fisher, Spivak, McClelland & Maier

[57] ABSTRACT

A device for enabling the assembly and disassembly of a top entry ball valve takes the form of a pin formed from rod-like material with a conical end. When the pins are inserted into the top surface of the valve housing the spring loaded valve seats are forced backwardly by the advance of the sloped face of the pins. In a second embodiment, the ends of the pins are teardrop shaped. After the pins are inserted, they are rotated 90° causing the seat to be pushed back by the larger diameter of the pin.

6 Claims, 8 Drawing Figures

VALVE ASSEMBLY AND DISASSEMBLY DEVICE

BACKGROUND OF THE INVENTION

The present application is a Continuation-in-Part of U.S. patent application Ser. No. 336,686 filed on Jan. 4, 1982.

This invention relates generally to a device for use in the assembly and disassembly of valves and more particularly to a device for compressing the springs in the valve seat of a top entry ball valve during assembly and disassembly.

Description of the Prior Art

Top entry ball valves have been a standard type of valve for many years. The valve includes two aligned flow ports with a ball placed between the ports. The ball contains a passage which may be turned so as to be aligned with the flow ports and permit the flow of the controlled fluid. Valve seats are placed between the ball and each port to seal the assembly. Recent valves have included spring loaded seats so as to effect a more perfect seal. While this aids the operation of the valve, it makes the assembly and disassembly of the device more complex. Generally, in order to remove the ball it is first necessary to move the seats backwardly against the force of the springs. The prior art shows many methods for performing this operation.

U.S. Pat. No. 4,266,566 to Kacal and Partridge shows a top entry ball valve having a spring loaded valve seat. In order to retract the seats, the ball carries a front cam face which engages the seat when the valve is fully opened. This retracts the seat, which may be locked in this position by means of a pin. The pin screws into the housing and holds the spring by frictional contact. This device requires that additional equipment be added to both the ball and housing, making the device more expensive and more subject to failure. In situations where the seats contain deposits which make the retraction difficult, it is necessary to apply considerable force through the ball and actuater assembly, risking damage to these parts.

Another method utilized for holding the seat in engagement with the ball is the use of an advancing screw having a pointed end. Instead of using a spring to apply the force to the valve seat, a screw is advanced forcing the seat toward the ball. Examples of this arrangement are seen in U.S. Pat. Nos. 3,171,431 and 3,037,738. These devices have the disadvantages of requiring adjustment of the screw and the resultant lack of precision. In addition, there is no mechanism for forcing the valve seat backwardly after the advancing force is removed. In cases of valves with deposits, the retraction of the seat may be difficult.

A third method for retraction of a valve seat is seen in U.S. Pat. No. 3,985,334. The valve includes an eccentric mounted on a shaft which is in engagement with the seat. When the shaft is rotated the eccentric forces the seat backwardly. This device requires the inclusion of additional moving parts and hence additional uncertainty in its operation. Limited amounts of force can be applied when deposits are present hence this mechanism may not always be effective.

SUMMARY OF THE INVENTION

Accordingly, one object of this invention is to provide a novel valve assembly and disassembly device capable of reliable operation.

Another object of the invention is to provide a valve assembly and disassembly device which does not require additional moving parts to be included in each valve.

An additional object of the invention is to provide a valve assembly and disassembly device which is capable of applying large amounts of force to retract valve seats having deposits.

A further object of the invention is to provide a valve assembly and disassembly device which is inexpensive and reliable.

Another object of the invention is to provide a valve assembly and disassembly device which requires no adjustments and does not interfere with the workings of the valve when not in use.

Another object of the invention is to provide a valve assembly and disassembly device which is portable and may be used separately from an individual valve.

Another object of the invention is to provide a valve assembly and disassembly device which is compact and has a small cover.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein.

DESCRIPTION OF THE PREFERRED EMBODIMENTS

Figure 1:
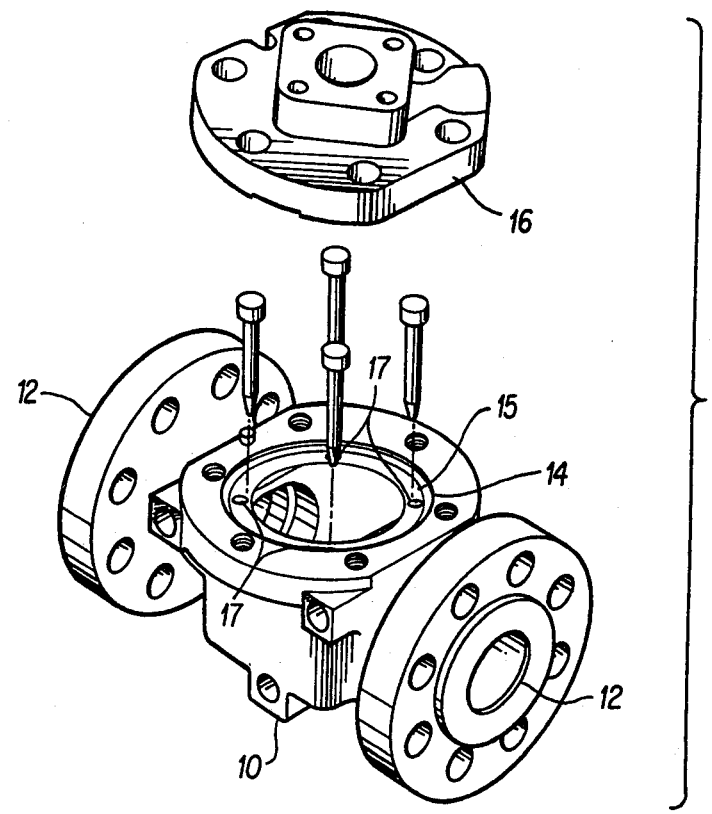
FIG. 1 is an exploded view of a valve including a first embodiment of the invention.

Referring now to the drawings, wherein like reference numerals designate identical or corresponding parts throughout the several views, and more particularly to FIG. 1 thereof, wherein an exploded view of a valve including the invention is shown as including the body 10 of a top entry ball valve having two flow ports 12 and a top opening 14. The top opening may be sealed by a cover 16 which may be bolted to the body. The flow ports may be connected to conduits for supplying and receiving the fluid to be controlled. The flow ports contain openings for receiving spring loaded seat retainers 28 which contain seats 24 for the valve. A central chamber is formed between the flow ports which is large enough to receive a ball and shaft and is open to the top opening.

The top opening is formed from a series of superposed openings of increasing diameter. The opening having the largest diameter, which is closest to the outside of the body, provides a cavity to receive the cover seal. The cover seal is assembled with the cover and together they effectively seal the top opening. The smallest opening provides a land 15 around its periphery containing four holes 17 for receiving the pins 18. The holes are placed so that two holes straddle each flow port. The geometry of the body around the holes provides support for the pins just short of the flow port centerline.

The pins are formed of elongated cylinders and may be manufactured from round stock material. The forward end of each pin is pointed, so as to form a conical portion. The rear end of each pin is enlarged so as to form a head, somewhat similar to a head on a nail. While the particular shape may be varied, the preferred embodiment includes a cylindrical head of larger diameter than the pin and being relatively thick in the axial direction. The head is formed so as to receive blows from a hammer or other impact devices.

Figure 2:
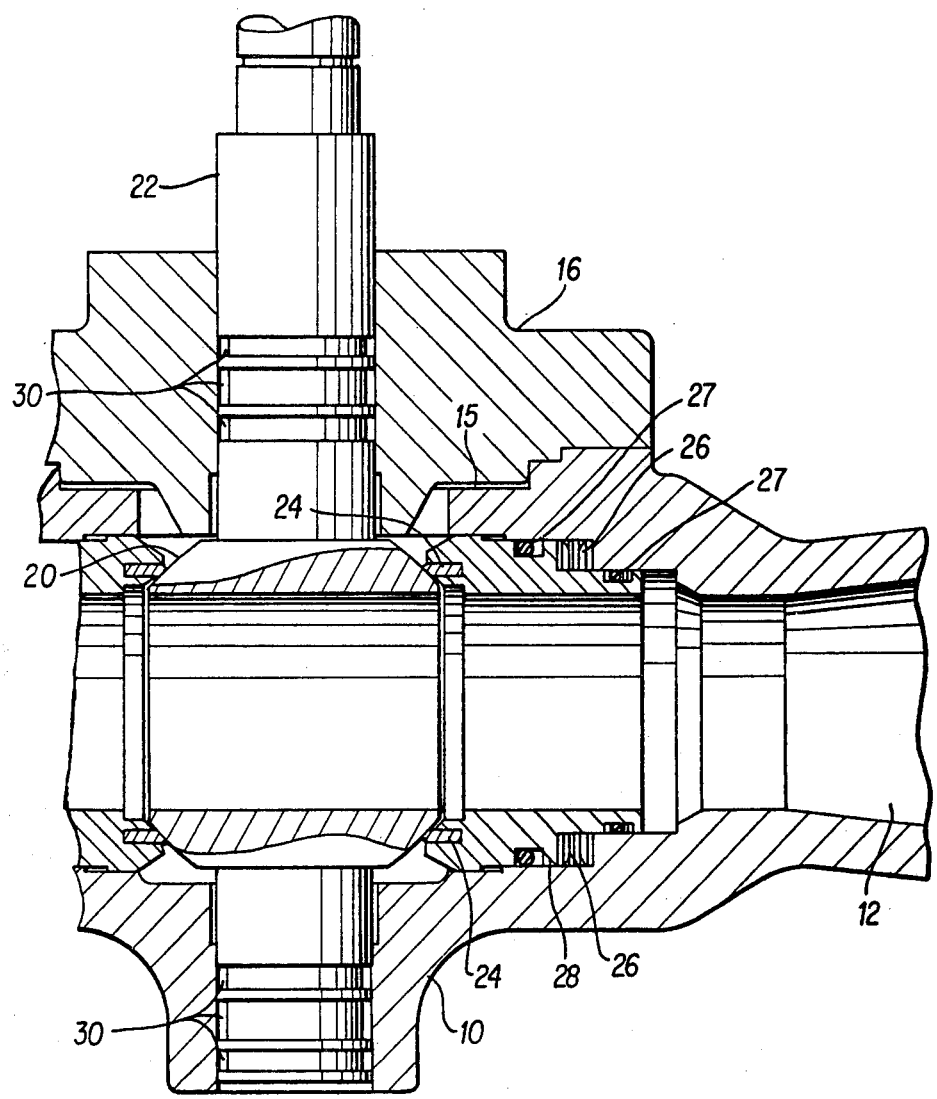
FIG. 2 is a cross section of a valve without the invention.

As can be seen in FIG. 2, the valve seats 24 may be held by a retainer 28 which is placed in the flow port 12. The retainer is biased away from the port and towards the ball by means of wave springs 26. "O" rings 27, act to seal the retainer to the body. The ball 20 and shaft 22 occupy the central cavity of the valve. The shaft extends through a central hole in the cover so that an actuating mechanism (not shown), such as a handle, may be attached to its upper end. Seals 30 are provided along the shaft to prevent leakage. The ball 20 mates with the valve seat 24 so as to form an effective seal. The spring bias provided by wave spring 26 forces the seat 24 into engagement with the ball.

Figure 3:
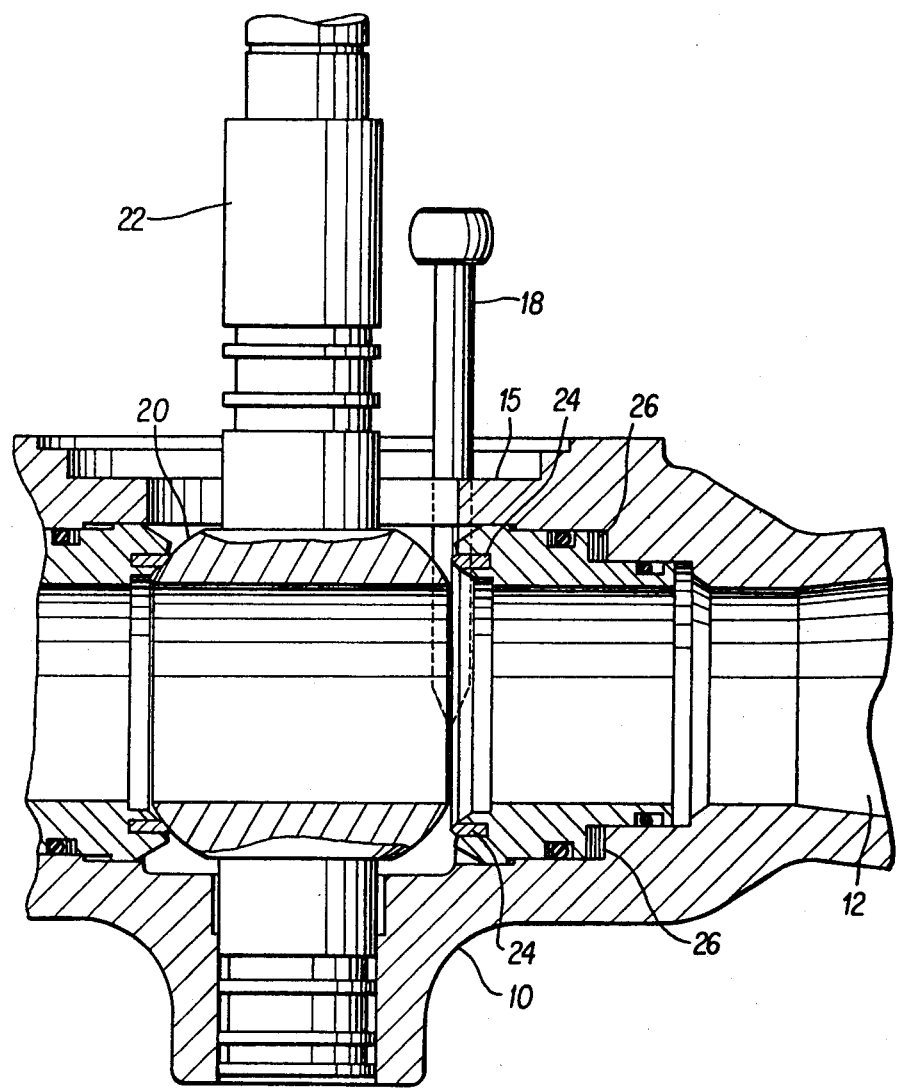
FIG. 3 is a cross section of a valve with the invention in position.
Figure 4:
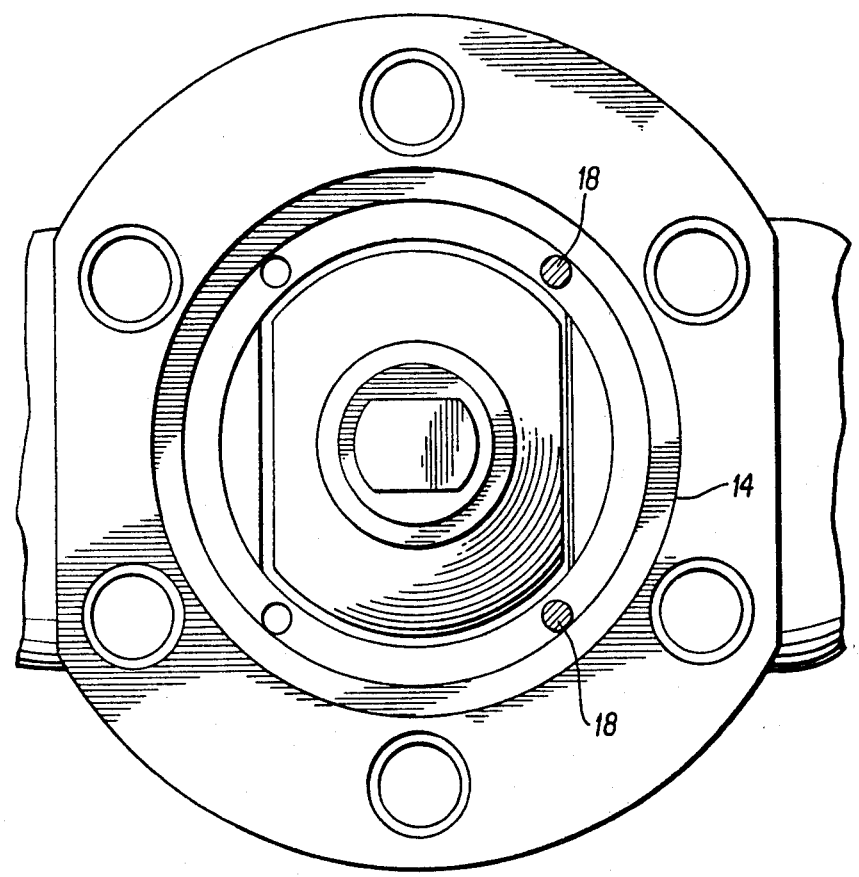
FIG. 4 is a top view of a valve with the invention in position.

FIG. 3 shows the same view as FIG. 2, but with the cover removed and with the pins 18 in position. The seat 24 and retainer 28 have been retracted away from the ball, causing the compression of spring 26. In this position, it is seen that the ball and shaft may be removed without touching the seat assembly. Similarly, FIG. 4 shows a top view of the valve with the pins in position and the seat retracted.

In operation, the pins need not be contained in the valve itself, but may be used only during the assembly and disassembly procedures. When it is necessary to inspect or replace parts of the valve, the cover is removed. The pins 18 are placed in the holes 17 and inserted until their forward pointed ends come into contact with the valve seat assembly. The heads of the pins may be pushed manually if possible or tapped with a hammer to force the seat backwardly by the camming action of the sloped surface against the seat assembly. The pair of pins around a single port should be actuated alternately so that the seat is retracted evenly. When one seat has been retracted, the other pair of pins may be utilized. Once both seats have been retracted, the ball and shaft may be removed. After the ball is removed, the pins may be removed to allow the seat assemblies to be removed. In order to remove the pins, it may be necessary to grip the rear portion with a tool such as a pliers or wrench.

In assembling, the reverse procedure is utilized. The seat assemblies are manually placed in position and the pins are inserted to hold the seats in the retracted position. The ball and shaft are inserted and the pins are removed, allowing the seats to contact the ball. The cover may then be replaced. It would also be possible to leave the pins within the valve if sufficient room were provided below the cover, so that a set of pins was readily available when needed.

The present invention is easier and less expensive to use than prior art devices. The only additional equipment necessary on the valve itself are the four holes which receive the pins. These are easily and inexpensively formed in the manufacturing process and require no maintenance. The pins are easily and inexpensively manufactured from readily available materials. One set of pins can be used for many valves, more like a separate tool than part of the valve. If a set of pins is not available a set may be field fabricated if necessary. If a valve contains deposits making retraction of the seats difficult, the ability to achieve a high mechanical advantage using tapered pins on tapered seat surfaces is advantageous. Similarly, the shock effect of hammering allows the device to be used where other devices would have failed. The device also allows the user to only perform part of the disassembly, such as only one seat, where necessary.

Figure 5:
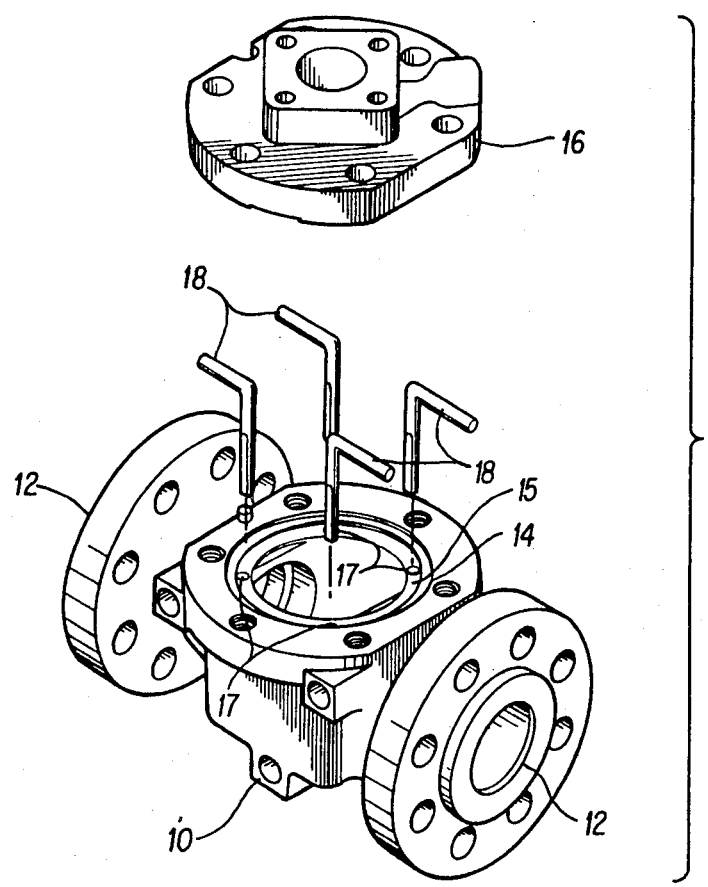
FIG. 5 is an exploded view of a valve including a second embodiment of the invention.
Figure 6:
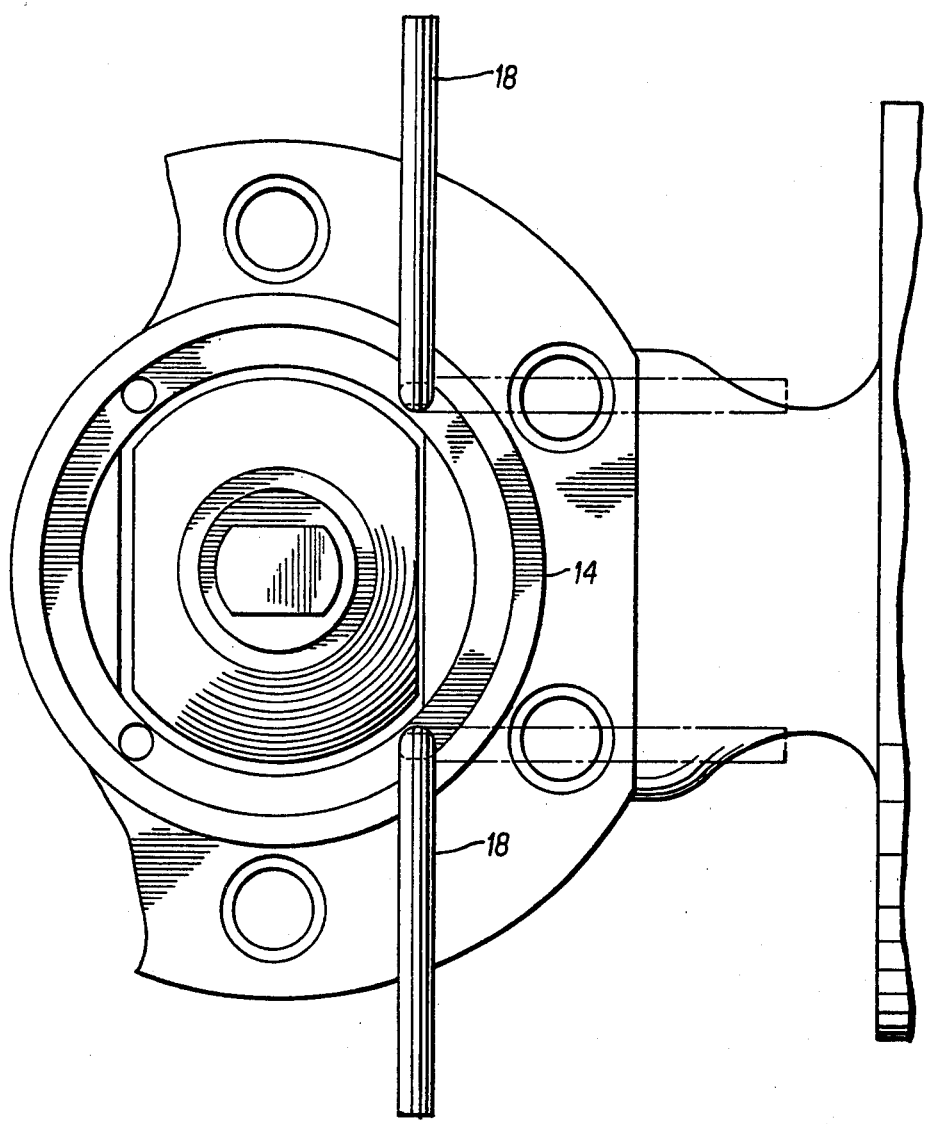
FIG. 6 is a top view of a valve with a second embodiment of the invention in position.

FIGS. 5 and 6 show a second embodiment of the present invention. FIG. 5 shows an exploded view of a top entry ball valve similar to FIG. 1 except that the pins utilized are of a different configuration. The pins of the second embodiment are also formed from round stock, but the rear ends are bent at a 90° angle to form a handle portion, similar to the handle arrangement of a common Allen wrench. The forward ends are made to form a teardrop shape in cross-section. The pins are inserted in the same manner as the first embodiment. The pin is placed so that the smaller diameter portion of the teardrop is in contact with the seat assembly. A pair of pins may then be rotated 90° by turning the handles. As the pins rotate, the larger diameter portion of the teardrop comes in contact with the seat assembly. Since the pin cannot move, the seat is pushed back by the larger diameter portion of the pin in a camming action. When the pin is rotated a full 90°, the seat is fully retracted.

In FIG. 6, the pins in the rotated position are shown in solid lines, while the pins in the original position are shown in phantom. While the shape of the pin has been described as teardrop shaped, any shape having two different diameters, such as an elliptical shape, could be utilized. The device in the second embodiment is easier to use than that of the first embodiment, since it is easier to rotate two handles at once than alternate tapping with a hammer. However, in cases where deposits make the retraction difficult it is possible to apply more force to the device of first embodiment by striking it with a hammer.

Figure 7:
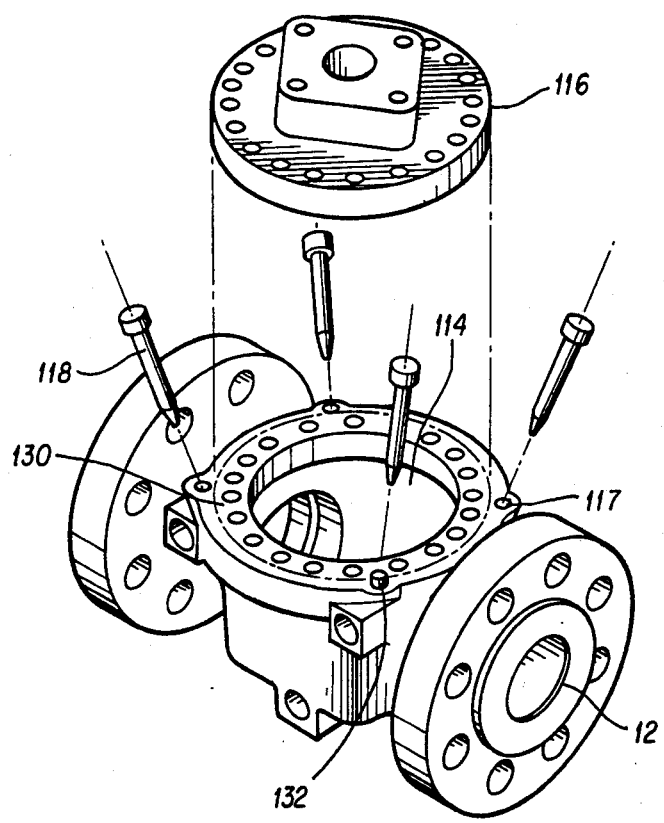
FIG. 7 is an exploded view of a third embodiment of the invention.
Figure 8:
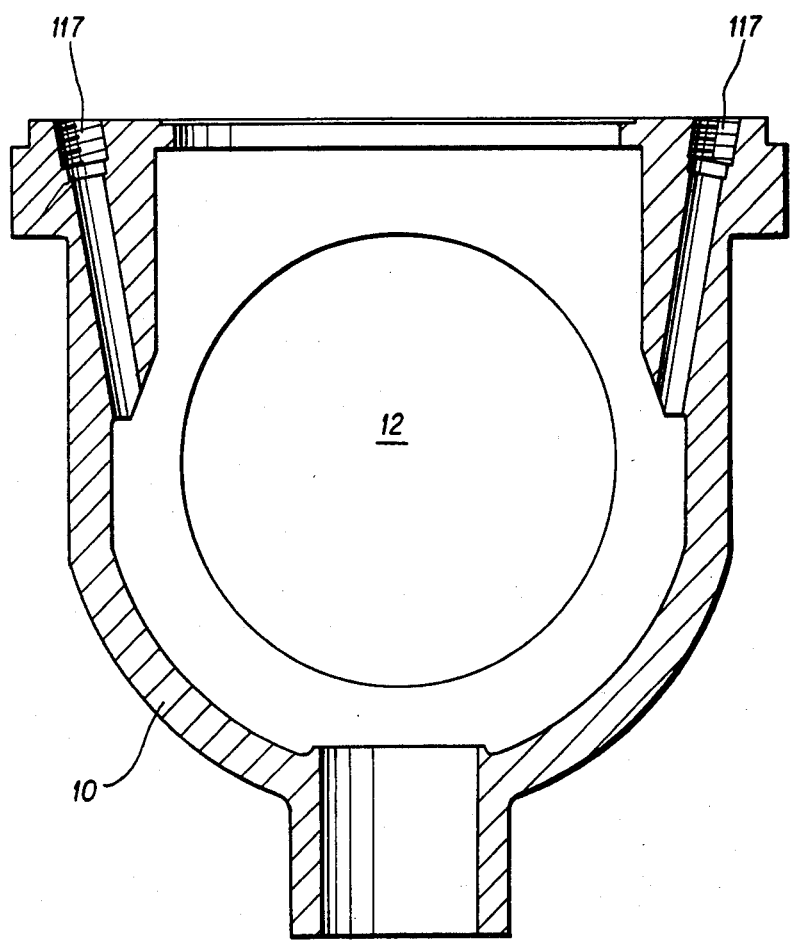
FIG. 8 is a view along line VIII—VIII in FIG. 7.

FIGS. 7 and 8 show a third embodiment of the invention which is identical to the embodiment of FIG. 1 except as noted below. In the embodiment of FIGS. 7 and 8, the pin receiving holes 117 are tipped outward so that they emerge from the top opening 114 of the body at a point outward from the cover 116. That is, the pin receiving holes 117 tilt away from the center of the top opening 114 in the upward direction. The holes 117 emerge on the top surface 130 at a point radially outward from the portion of the surface 130 which is covered by the cover 116 (the covered portion is shown in dotted lines in FIG. 7).

Plugs 132 may be threadedly inserted into the holes 117 to close these holes when the pins 18 are removed. Although only one such plug is shown in FIG. 7, it is, of course, to be understood that all of the holes 117 would be so plugged.

The embodiment of FIGS. 7 and 8 provides several advantages over the earlier embodiments. First, since the holes need not extend from a land covered by the cover 116, the land 15 of FIG. 1 can be eliminated. In addition, it is possible to reduce the size of the cover since it need not cover the holes 117. This reduces the weight of the valve. The reduction in cover diameter also allows a full bore valve to comply with length standards which would otherwise be impossible. Finally, since the holes 117 are not covered by the cover 116, it is possible to retract the valve seats while the cover remains on the valve.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A valve having a retractable valve seat, including a valve body having an inlet port, an outlet port and an upper opening in a first surface intermediate said inlet and output ports, a cover for closing the upper opening, a valve member for controlling the flow of fluid between the inlet port and outlet port, said valve seat being in contact with the valve member and a central chamber between said inlet port and said outlet port for receiving said valve member, said valve further comprising:

means for retracting said valve seat, said means for retraction being formed of an elongated main section, a forward section and a rear section, said forward section including a camming surface for contacting said valve seat and having a variable diameter as well as a constant diameter portion, said rear section being formed for receiving a force for moving the means for retraction; and
   said first surface having holes formed therein for receiving said means for retraction, said holes being formed in a portion of said first surface which is not sealingly covered by said cover, whereby said means for retraction may be inserted in said holes without removing said cover;
   wherein said movement of the means for retraction causes the point of said contact of said camming surface to change to a point having said constant diameter, forcing said seat to retract and remain retracted in a locked position by said constant diameter.

2. A device according to claim 1, wherein said forward section is formed in the shape of a cone, and said movement is axial.

3. A device according to claim 2, wherein said rear section is formed in a head for receiving force from a hammer.

4. A device according to claim 1, wherein said forward section has a teardrop shaped cross-section and said movement is rotational.

5. A device according to claim 4, wherein said rear section is formed as a handle for receiving a turning force.

6. A valve having a retractable valve seat, including a valve body having an inlet port, an outlet port and an upper opening in a first surface intermediate said inlet and output ports, a cover for closing the upper opening, a valve member for controlling the flow of fluid between the inlet port and outlet port, said valve seat being in contact with the valve member and a central chamber between said inlet port and said outlet port for receiving said valve member, said valve further comprising:

means for retracting said valve seat, said means for retraction being formed of an elongated main section, a forward section and a rear section, said forward section including a camming surface for contacting said valve seat and having a variable diameter as well as a constant diameter portion, said rear section being formed for receiving a force for moving the means for retraction; and
   said first surface having holes formed therein for receiving said means for retraction;
   wherein said movement of the means for retraction causes the point of said contact of said camming surface to change to a point having said constant diameter, forcing said seat to retract and remain retracted in a locked position by said constant diameter;
   wherein said holes define bores extending into said valve body at an oblique angle to said first surface.

* * * * *